(12) United States Patent
Kull (10) Patent No.: US 6,839,664 B1
(45) Date of Patent: *Jan. 4, 2005

(54) ELECTRICALLY CONTROLLED PNEUMATIC END OF TRAIN PNEUMATIC EMULATION SYSTEM

(75) Inventor: Robert C. Kull, Olney, MD (US)

(73) Assignee: Wabtec Holding Corporation, Wilmerding, PA (US)

( * ) Notice: Subject to any disclaimer, the term of this patent is extended or adjusted under 35 U.S.C. 154(b) by 814 days.

This patent is subject to a terminal disclaimer.

(21) Appl. No.: 09/590,696

(22) Filed: Jun. 9, 2000

(51) Int. Cl.[7] .................... G06F 9/455; B60T 15/14
(52) U.S. Cl. .................... 703/23; 703/8; 303/7; 303/15
(58) Field of Search ................ 340/3.51; 703/8, 703/23; 73/39, 121; 246/167, 169; 303/3, 5, 15, 20, 47, 86

(56) References Cited

U.S. PATENT DOCUMENTS

| | | | | |
|---|---|---|---|---|
| 5,873,638 A | * | 2/1999 | Bezos | 303/47 |
| 6,102,491 A | * | 8/2000 | Bezos | 303/47 |
| 6,213,565 B1 | * | 4/2001 | Hart | 303/7 |
| 6,217,126 B1 | * | 4/2001 | Kull | 303/3 |
| 6,227,625 B1 | * | 5/2001 | Gaughan | 303/15 |
| 6,229,452 B1 | * | 5/2001 | Kull | 340/3.51 |
| 6,435,623 B1 | * | 8/2002 | Peltz | 303/15 |

OTHER PUBLICATIONS

McLean et al., L.A. Zeffron's Chameleon—A Solution to the ECP Problem of Migration, Proceedings of the 1998 ASME/IEEE Joint Railroad Conference, Apr. 1998, pp. 125–127.*

En-Dean Chen et al., T. Economic Considerations of Operating a Train with Electronically Controlled Pneumatic (ECP) Brakes, Proceedings of the 1998 ASME/IEEE Joint Railroad Conference, Apr. 1998, pp. 9–19.*

Kull, R.C. Wabtec ECP System Update, Proceedings of the 2001 IEEE/ASME Joint Railroad Conference, Apr. 2001, pp. 129–134.*

* cited by examiner

Primary Examiner—Russell Frejd
(74) Attorney, Agent, or Firm—Webb Ziesenheim Logsdon Orkin & Hanson, P.C.

(57) ABSTRACT

An electronically controlled pneumatic (ECP) end of train (EOT) pneumatic emulation system allows fill train operation of standalone ECP unit trains, even with non-ECP equipped locomotives. The emulation system is based on close integration with the EOT system and allows operation of unit trains equipped with "all electric" ECP without pneumatic overlay or emulation capability, using standard, non-ECP equipped locomotives.

20 Claims, 3 Drawing Sheets

ELECTRICALLY CONTROLLED PNEUMATIC END OF TRAIN PNEUMATIC EMULATION SYSTEM

BACKGROUND OF THE INVENTION

1. Field of the Invention

The present invention generally relates to an electronically controlled pneumatic (ECP) end of train (EOT) pneumatic emulation system and, more particularly, to a pneumatic emulation system which allows full train speed operation of standalone ECP train units with non-ECP equipped locomotives.

2. Background Description

Air brakes are the most commonly used brakes for freight trains. These brakes use changes compressed air pressure to control the operation of the brakes at each car along the train. A "brake pipe" connects all of the cars in the train and the locomotives, with the locomotives supplying the pressurized air to the brake pipe. The brake pipe may extend upwards of one mile or longer and provide the necessary air pressure to the brakes of each car of the train for braking operations.

In the most typical brake application systems, the brake control is actuated from a "driver's brake valve". The driver's brake valve allows air to be fed into the brake pipe or released from the brake pipe during the braking operations. A distributor or "triple valve" located on each car also monitors the pressure in the brake pipe such that when brake pipe pressure falls below a certain level, the distributor allows air from an auxiliary reservoir to pass to the brake cylinders in order to activate the brakes of each train car. However, when the brake pipe pressure rises above a certain level, the distributor releases the air from the brake cylinders and recharges the auxiliary reservoir for the next braking application.

As is known to one skilled in the art, such long brake pipe lengths pose serious obstacles that must be overcome, such as, for example, controlling the air pressure along the entire length of the brake pipe in order to ensure adequate braking of the freight train. In order to address this problem, end-of-train (EOT) units were developed to monitor the air pressure within the brake pipe at the last car of the freight train. These EOT units are coupled to the locomotive via a radio link or other communication link so that the EOT unit can monitor brake pipe pressure and communicate such information to the engineer in the locomotive. Another problem of conventional brake systems using pneumatic control system is slow propagation rates of the compressed air along the brake pipe which reduces the braking efficiency of the train as well as the inability for graduated release. To address this problem, EOT units were modified to provide two-way communication between the locomotive and the EOT unit. The EOT unit was provided with a valve that could be actuated by command from the locomotive so as to vent the brake pipe to atmosphere in emergency braking situations, reducing by half the propagation rate of the emergency brake operation.

In order to solve the problem of slow propagation rates for service brake operation as well as generally improving the responsiveness of the braking application, Electronically Controlled Pneumatic (ECP) systems are implemented for use with the braking application system. ECP systems employ electrically controlled valves at each car in the train. Service (and emergency) brake operation is initiated and controlled by an electrical signal, which is typically propagated along a trainline that extends the entire length of the train, although a wireless link can also be used.

Currently, ECP system implementation has begun as overlay systems, but there is a desire to move to "all electric" service operations. This is primarily driven by the extra costs associated with the need to support both pneumatic and ECP brake application systems on each train car of the train consist. At the present time there are two alternative approaches for providing all electric ECP operation:

Standalone ECP; and

Emulation Capability ECP.

The lowest cost implementation in ECP systems is the "standalone" system, which does not include the extra two valves needed for providing pneumatics emulation capability (quick service and quick release). At the present time, the standalone system is desirable for captive fleets, where a relatively small number of locomotives can be equipped for ECP operation. However, implementation of ECP systems on major Class 1 railroads is more challenging due to the difficulty in dedicating locomotives for ECP operation prior to equipping the entire fleet.

The ECP system may be retrofitted to trains (including the locomotive and EOT unit) while using conventional air brake pipes, and may operate individual valves in order to control the brakes of each train car of the train consist. This retrofitting may include providing a control system hardwired to each of the trains via a cable extending the length of the train as well as a communication link and control system housed in the locomotive. In operation, the ECP control unit codes and sends signals to all of the cars in the train in order to control the braking operations. Once the individual cars receive the signals, the compressed air from the reservoirs is released in order to activate the brake cylinder until a desired cylinder pressure is achieved in each of the individual cars. Microprocessors on each of the cars continuously monitor brake cylinder pressure against leakage and maintain the desired pressure. Thus, since there are no flow controls and the like, a theoretically instantaneous reaction from all cars in the train is possible, thereby making ECP controlled brakes very responsive (i.e., a change in air pressure of the brake pipe does not have to propagate from the beginning of the train to the end of the train).

A drawback to ECP systems is the cost of implementing the equipment for an entire fleet such as, for example, retrofitting the locomotive with control units and transceivers and each car with sensors, control valves and the like. Moreover, the standalone ECP systems, without emulation capability, still need to have a level of "limp home" capability to accommodate cases where the only available locomotives are not ECP equipped, or there is an in-route failure of the ECP head-end-unit (HEU) hardware. Unfortunately, without having quick service and release capabilities, the ability to emulate pneumatic brake operation is quite limited, and would result in severe speed restrictions probably in the area of 20 mph. This would not be acceptable for planned operation with non-ECP equipped locomotives for any significant distances.

SUMMARY OF THE INVENTION

It is an object of the present invention to provide a system which is capable of operating unit trains equipped with "all electric" ECP systems without pneumatic overlay or emulation capability using standard non-ECP equipped locomotives.

It is still of a further object of the present invention to provide a system which is capable of electrical propagation of brake commands to all cars in a train simultaneously.

It is another object of the present invention to provide a system which is capable of individual car back-up operation by following the brake pipe pressure in the event of message loss or selected electronic failures.

It is still another object of the present invention to provide a system which is capable of intermixing cars equipped with conventional pneumatic valves with ECP cabling with electrically controlled train cars.

It is also a further object of the present invention to provide a system which is capable of migrating train operations from pneumatic operation to ECP operation, both by mixing of train cars and by the use of non-ECP equipped locomotives.

The present invention is directed to an electronically controlled pneumatic (ECP) end of train (EOT) pneumatic emulation system. This system includes a locomotive air brake system and a locomotive control unit coupled to a lead locomotive. An ECP/head-of-train (HOT) interface unit communicates with the locomotive control unit (LCU) and acts as an interface between the LCU and each car of the train consist via communication links. By using the communications data links, each car including the locomotive has the ability to communicate with each other via the ECP trainline, and the LCU has the further ability to provide system set-up and status reporting. The brake commands may be in response to EOT and ECP data received from the cars and an EOT via the ECP/HOT interface unit.

The ECP/HOT interface unit includes software modified EOT which acts as the ECP Head End Unit (HEU) to the remaining train cars of the train consist and which provides brake commands in response to changes in the brake pipe pressure. Individual ECP equipped cars may respond primarily to the data messages over the ECP trainline as initiated from the ECP/HOT interface unit. However, the ECP equipped cars may also apply and release the brake applications in response to changes in brake pipe pressure in a manner similar to conventional pneumatic brake valves when there is a failure to receive the ECP message. This feature thus allows ECP equipped train cars to operate with conventionally equipped pneumatic brakes so long as the ECP trainline maintains train electrical continuity. Thus, the systems of the present invention may be implemented using a mixed fleet of ECP and non-ECP equipped trains.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention generally relates to intra-train communications for implementing Electrically Controlled Pneumatic (ECP) railroad freight train brakes on a train car. More specifically, the present invention allows full train speed operation of standalone ECP unit trains, even with non-ECP equipped locomotives. The system of the present invention is based upon a close operational integration with the end of train (EOT) system and preferably maintains full brake pipe continuity and normal pneumatic emergency functions throughout each train car of the train consist.

One of the primary advantages of using the system of the present invention is that the same pneumatic gages or screen indicators used for conventional pneumatics operation as the main feedback of braking action on lead locomotives may be used with the system of the present invention. In this way, a lead locomotive does not have to be retrofitted for ECP operations. Also, unlike conventional systems, the train brake applications implemented by the present invention may be released as a unit which significantly reduces slack action of the brake operations.

System of the Present Invention

Figure 1:
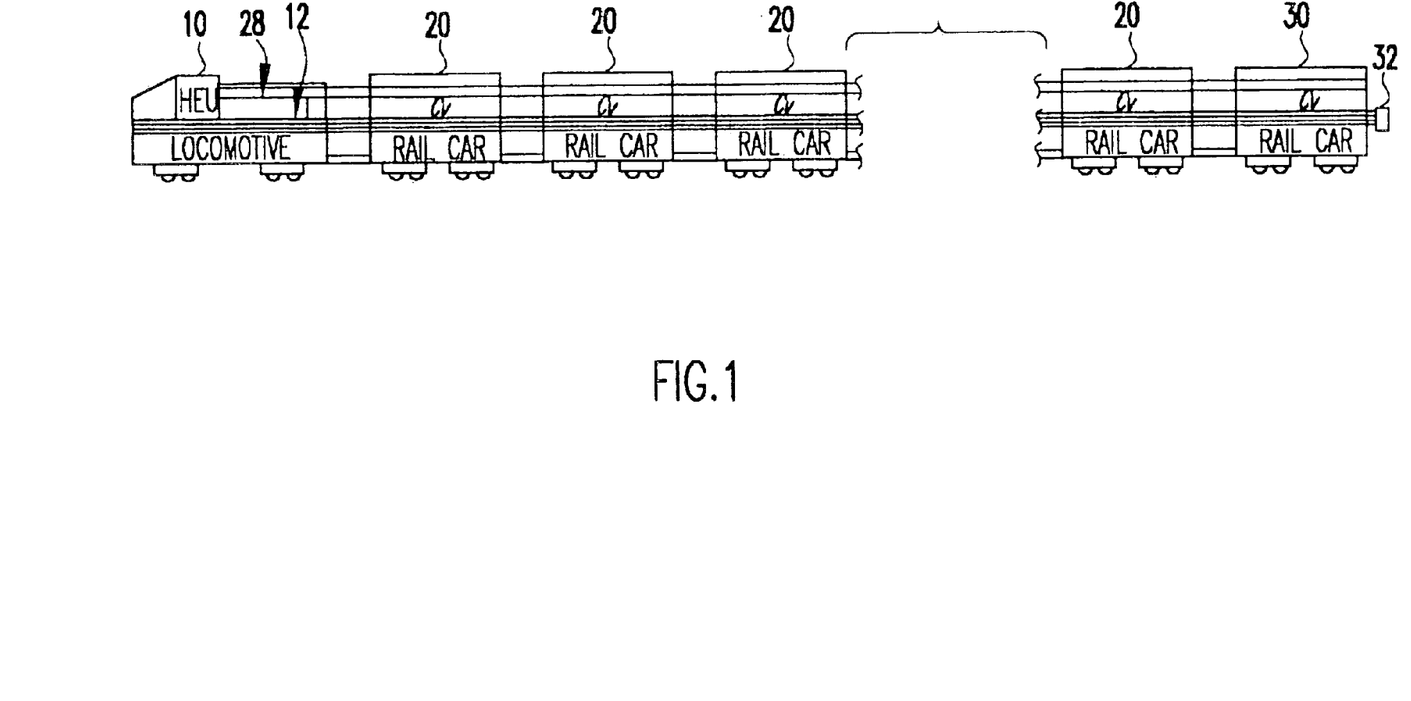
FIG. 1 shows railcars and a lead locomotive in a train consist pneumatically coupled to one another via a brake pipe.

Referring now to the drawings, and more particularly to FIG. 1, there is shown several cars 20 of a train consist which are pneumatically coupled to a lead locomotive 10 by a brake pipe 12 and electrically connected to the lead locomotive by a trainline 28. The last car 30 of the train has attached to it an EOT unit 32. The train cars 20 (including the lead locomotive 10 and the last car 30) are further provided with a brake control valve device $C_v$, which may be a valve device that meets the standards of the Association of American Railroads (A.A.R.), such as an ABD, ABDW or ABDX valve manufactured by Westinghouse Air Brake Company (WABCO) (now known as (Wabtec)). As is well known in the railroad art, these car control valve devices, $C_v$, operate to control the car brakes in response to variations of the train brake pipe pressure at the respective train cars.

Figure 2:
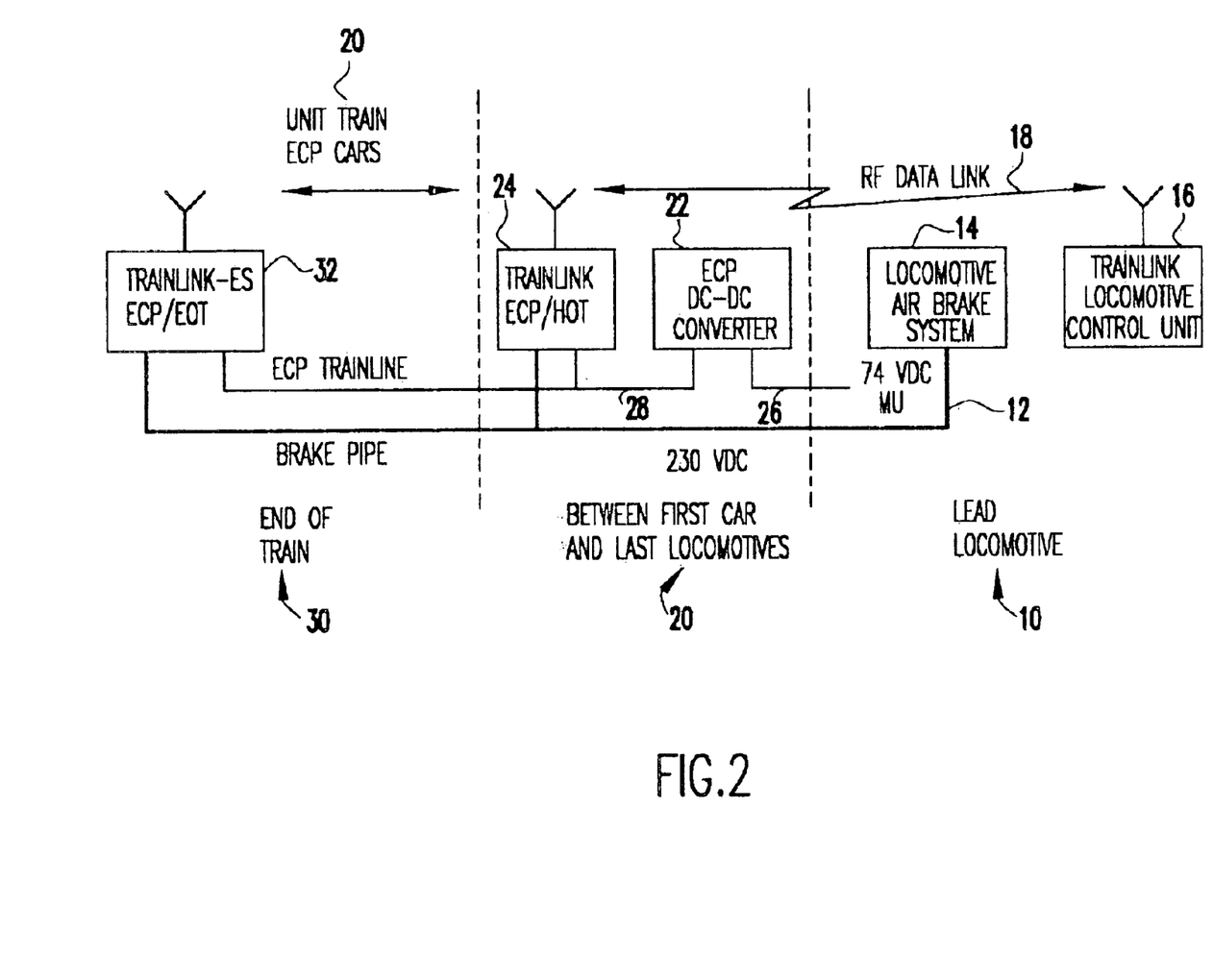
FIG. 2 is a block diagram showing the electronically controlled pneumatic (ECP) end of train (EOT) pneumatic emulation system of the present invention.

FIG. 2 shows a block diagram illustrating the electronically controlled pneumatic (ECP) end of train (EOT) pneumatic emulation system of the present invention. As seen in FIG. 2, the lead locomotive 10 includes a locomotive air brake system 14 and a locomotive control unit (LCU) 16. An ECP/head-of-train (HOT) interface unit 24 communicates with the LCU 16 and further communicates with an ECP/EOT 32 on the EOT 30. The ECP/HOT interface unit 24 thus acts as an interface between the LCU 16 and each car of the train consist so that each car including the locomotive has the ability to communicate with each other via the ECP trainline 28. In this configuration, the locomotive control unit 16 has the ability to provide system set-up and status reporting. The communication link between the LCU 16 and the ECP/HOT interface unit 24 is preferably a radio frequency (RF) link and the communication link between the ECP/HOT interface unit 24 and the EOT/ECP is preferably an ECP trainline 28.

Still referring to FIG. 2, the ECP/HOT interface unit 24 is preferably mounted between the last locomotive and a first train car 20 of the train consist with a "T" brake pipe connection, and the ECP/EOT unit 32 is preferably located on the last car 30. As should be well understood by one of ordinary skill in the art, the ECP/EOT unit 32, amongst other functions, provides a mechanism for exhausting brake pipe pressure at a service rate based upon data commands from the ECP trainline 28. For illustrative purposes only, the present invention may be used with the TrainLink®-ES system manufactured by Wabtec Railway Electronics of Germantown, Maryland; however, it is should be understood that the present system may be equally implemented using other alternative EOT system solutions. "TrainLink" is a registered trademark of Wabtec, and the "ES" (Extended Service) system provides service area brake pipe reductions to match the locomotive which speeds the reductions of brake pipe pressure to the command level over the full train length.

As further seen in FIG. 2, a pneumatic brake pipe 12 is in fluid communication with all of the cars and locomotives. The brake pipe 12 is thus capable of providing the necessary air pressure to the brakes of each car for braking operations. The brake pipe pressure is supplied by the locomotive air brake system 14 and controlled by the LCU 16. As further seen in FIG. 2, an ECP DC-DC convertor 22 connects a 74 Volt DC Multiple Unit (MU) connection 26 and the ECP trainline cable interface 28 (230 Volt DC) in order to convert the 74 Volt DC to 230 Volt DC for train operations.

In the preferred embodiments of the present invention, the ECP/HOT interface unit 24 includes software modified EOT which acts as the ECP Head End Unit (HEU) to the remaining cars of the train consist and which further provides brake commands in response to changes in brake pipe pressure. Also, the ECP/HOT interface unit 24 may use the auxiliary text display and sonic alert system in the lead locomotive 10 for set-up and alarm information. It should be understood that the software implemented with the present invention may be implemented using a plurality of separate dedicated or programmable integrated or other electronic circuits or devices (e.g., hardwired electronic or logic circuits such as discrete element circuits, or programmable logic devices). A suitably programmed general purpose computer, e.g., a microprocessor, microcontroller or other processor device, either alone or in conjunction with one or more peripheral (e.g., integrated circuit) data and signal processing devices can also be used to implement the invention. In general, any device or assembly of devices on which a finite state machine capable of implementing the flow charts shown in the figures can be used as a controller with the invention.

In the configuration thus described with reference to FIG. 2, the ECP/HOT interface unit 24 acts as a communication link between the locomotive control unit 16 and the ECP/EOT 32 so that EOT data from the ECP/EOT 32 can be provided to the locomotive control unit 16. In this manner, the full set of ECP train cars implementing the present invention may be considered a single unit with the ability for individual train cars to communicate with each other via the ECP trainline 26 and the locomotive control unit 16 has the ability to provide brake commands to the ECP equipped cars 20 via the ECT/HOT interface unit 24. Also, in view of the configuration as illustrated in FIG. 2, the data link between the cars 20 and the lead locomotive 10 is shortened thereby providing improved and reliable communications between the cars 20 and the lead locomotive 10.

Figure 3:
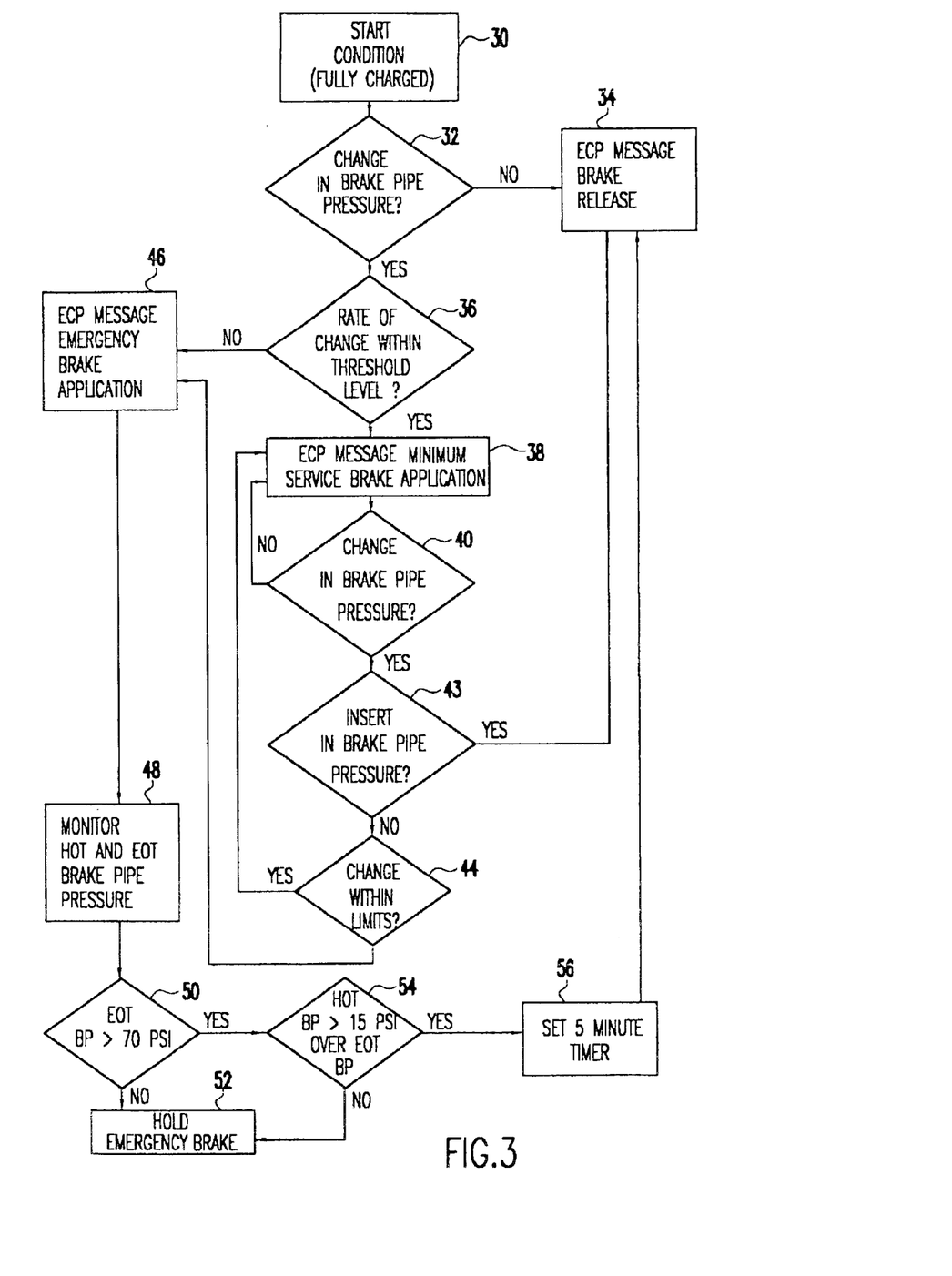
FIG. 3 is a flow diagram showing the method steps of the present invention.

FIG. 3 is a flow diagram showing the logic of the ECP/HOT interface unit 24 of the present invention. In step 30, a fully charged brake pipe pressure (e.g., brakes are in a fully released condition) of, for example, 90 PSI is provided as a start condition. It should be understood by those skilled in the art that the numbers provided in this flow chart are for illustrative purposes only and that other numbers including brake pipe pressure reductions, start brake pipe pressure conditions and other limits and thresholds are contemplated for use with the present invention. However, in this exemplary flow chart, all numbers provided herein are related to a start brake pipe pressure of 90 PSI.

In step 32, a determination is made as to whether there is a change in the start brake pipe pressure. If there is no change in the start brake pipe pressure, an ECP message is broadcast to the EOT and each individual car that the brake pipe pressure has not been released and is thus in a stable fully charged condition (step 34). If there is a change in brake pipe pressure, a determination is made in step 36 as to whether the rate of change is within a threshold limit (e.g., a fast rate of change (emergency application) or a slow rate of change (service brake application)). The threshold limit is a service brake application limit which is preferably a drop in brake pipe pressure of less than 16.6 PSI/sec.

If the rate of change is within the service brake application limit, an ECP message is broadcast to the EOT and the individual train cars to make a service brake application in step 38. This service brake application is typically a 10% brake application; that is, a 6 PSI reduction in brake pipe pressure when the stable fully charged brake pressure is approximately 90 PSI. The minimum brake application is approximately 2 PSI to 3 PSI reduction in brake pipe pressure. In step 40, the system of the present invention then continues to monitor whether there is a further brake pipe pressure reduction. If there is no further brake pipe reduction in step 40, the system then reverts to step 38 at which time the system of the present invention broadcasts to the EOT and the individual cars an ECP message to make no further brake pipe pressure reductions.

If there is a change in brake pipe pressure in step 40, a determination is made as to whether there is an increase in brake pipe pressure in step 42. If there is an increase in brake pipe pressure, an ECP message is broadcast to the EOT and each individual car indicating that the brake pipe pressure should be increased to fully charge the brake pipe pressure. If there is no increase in brake pipe pressure, in step 44, a determination is made as to whether a change in the brake pipe pressure is within a minimum service brake application limit. In this example, the change in minimum service brake application may be, for example, between 10% to 100% of full service brake application; that is a reduction from approximately 6 PSI to 26 PSI in brake pipe pressure. If the change in the brake application is within these limits, the system reverts to step 38. In step 38, the system of the present invention broadcasts an ECP message to the EOT and the individual cars to make the appropriate brake pipe pressure reduction.

If the change in brake pipe pressure is not within the minimum service brake application in step 44 or the rate of change in step 36 is not within the threshold limit, the system of the present invention will broadcast an ECP message to the EOT and the individual cars to make an emergency brake application (step 46). In the preferred embodiment, if the brake pipe pressure is below approximately 60 PSI or is approximately 120% of the full service brake application as determined in step 44, the emergency brake application ECP message will be broadcast in step 46.

After the emergency brake application is provided in step 46, the system of the present invention monitors the brake pipe pressure in step 48. If the brake pipe pressure measured by the EOT is less than a certain limit (step 50), for example, 70 PSI, the system of the present invention will hold the emergency brake application in step 52. If the brake pipe pressure measured by the EOT is greater than the limit of 70 PSI, a determination is made in step 54 as to whether the brake pipe pressure measured by the HOT is greater than 15 PSI above the EOT brake pipe pressure. If not, the system of the present invention will hold the emergency brake application in step 52. However, if the HOT brake pipe pressure is greater than 15 PSI above the EOT brake pipe pressure, a timer is set for example at five minutes to recharge the brake pipe pressure to the start brake pipe pressure condition. The system of the present invention then reverts to step 34.

The Implementation of the Present Invention

In the system of the present invention, the brake pipe 12 provides the necessary air pressure to the brakes of each train car for braking operations as in conventional braking application systems. As soon as a set brake pipe reduction (combination rate and level) is detected by the ECP/HOT interface unit 24, an ECP message is provided to make a minimum service application to the LCU 16 via the RF data link 18. It is of importance to note that the brake pipe reduction detected by the ECP/HOT interface unit 24 is equivalent to actions triggering present quick service applications.

The minimum service application is then acted upon by each ECP equipped train car as well as the ECP/EOT unit 32. The combination of ECP car applications with further assistance by the ECP/EOT unit 32 quickly bring the entire brake pressure down to the minimum service level (6 psi reduction). Subsequent brake pipe reduction commands from the lead locomotive 10 are then more quickly detected at the ECP/HOT interface unit 24 without less impact to the air capacity in the brake pressure over the train length (as compared to not exhausting air from the ECP/EOT unit 32).

As further brake pipe reductions are detected by the ECP/HOT interface unit 24, additional ECP commands are then sent to the LCU 16 to increase the braking level on each train car as well as to keep exhausting the desired amount of air from the ECP/EOT unit 32. A rate sensitive feature may also be used to speed ECP/HOT interface unit 24 responses to reductions in brake pipe pressure based upon knowledge of train length as derived from each car ECP set-up data as well as the EOT pressure. It is noted also that the rate brake pipe pressure drop may predict the level of brake reduction being commanded from the lead locomotive 10.

Individual ECP equipped train cars may respond primarily to the data messages over the ECP trainline 28 as initiated from the ECP/HOT interface unit 24. However, the ECP equipped train cars may also apply and release the brakes in response to changes in brake pipe pressure in a manner similar to conventional pneumatic brake valves when there is a failure to receive the ECP message. This feature thus allows ECP equipped cars to operate with conventionally equipped pneumatic brakes so long as the ECP trainline 28 maintains train electrical continuity. This feature also allows overlay ECP systems to allow continued brake operation under pure pneumatics control in the event of ECP electronics failure.

The present invention may also be implemented with EOT non-equipped service brake exhaust (ES) capability. This would, of course, slow the reduction of brake pipe pressure over the full train length and marginally slow the ability for the ECP/HOT interface unit 24 to detect locomotive initiated brake pipe reductions beyond the initial application. However, HOT analysis of brake pipe reduction rate in combination with a known train length would allow narrowing of the detection speed disadvantage.

The present invention can equally support both direct release and graduated release braking applications. The graduated release braking applications can be supported by switching the locomotive air brake into "passenger" mode. In the graduated release implementation, the ECP/HOT interface unit 24 sends ECP commands to release brake pipe pressure in steps as the brake pipe pressure is restored. The ECP/HOT interface unit 24 may also include a rate sensitive feature so that a full release may be detected and acted upon based upon a fast rise in brake pipe pressure without waiting for full restoration to the feed valve pressure. This results in the graduated restoration of brake pipe pressure in response to service handle position.

In the preferred embodiment, a TrainLink® ECP/EOT 32 hardware design manufactured by Wabtec Railways Electronics will be used as a basis for the ECP/HOT interface unit 24. Ideally, the identical hardware will be used for both ends of the train (e.g., the ECP/EOT unit 32 and the ECP/HOT interface unit 24) with software configured to perform either function. In this way, ECP/HOT interface unit 24 may be maintained on each end of the train consist, and would thus work in its intended manner regardless if the train changes directions (locomotives moved to opposite end) at the destination points.

In this configuration, the 230 Volt DC power supply ECP trainline 28 may include its own Echelon™ ECP data interface to provide a means for on/off power control. Echelon is a common standard used for ECP cable overlay data communications. Specifically, the communication protocol of the present invention is preferably compatible with the Echelon transceiver as specified on page 2, paragraph 3.1.2 of A.A.R. specification S-4230 Intra-Train Communication Specification adopted May 1997. It is noted that the "neuron" transceiver conforms to specifications of the Echelon Corporation and is comprised of two commercially available components. The first component is the "neuron" chip which is a sophisticated very large scale integrated (VLSI) device that incorporates communications, control, scheduling and input/output (I/O) support. The neuron chip enables devices to communicate with one another using the Echelon LonTalk™ protocol which supports distributed peer-to-peer communication. Neuron chip, model number 3120 and 3150, are PLT-10 or PLT 22 or other equivalent power line transceiver modules which supports the Echelon LonTalk™ power line communications technology.

Additionally, the ECP trainline interface would be a separate unit which can be moved to the end of the locomotive consist. The ECP/HOT interface unit 24 would preferably include three external cable connectors (or pigtails):

1. Locomotive MU Cable (for 74 VDC)
2. HOT (ECP cable connector)
3. ECP Trainline As in the A.A.R. S-4200 specifications, any loss of ECP trainline continuity based upon loss of EOT and HOT beacons can be used to cut off the 230 VDC power. This approach has the lowest hardware development cost based upon using the EOT as an HOT interface unit. The only new hardware would include a portable power supply.

Alternate Implementations of the Present Invention

While standard locomotives can be used without being ECP equipped, they would need to have software upgrades to the locomotive control units (LCUs). Also, integrated cab applications would need locomotive engineer display software updates as well being able to support auxiliary massaging capability. An alternative for non-ECP equipped locomotives may include a portable LCU with receiver and display only functions. The existing LCUs would be used for normal EOT operation while communicating via the ECP/HOT interface unit 24, and the portable LCU would be used to display ECP related text messages. This portable LCU unit may include an integral antenna due to the short transmission distance. The only installation issues would be for connecting to locomotive power and temporary mounting on the control stand of the lead locomotive.

In another embodiment, the LCU may be upgraded for TrainLink-ES capability. This would allow the locomotive control unit to communicate equalizing reservoir changes by RF data link to the ECP/HOT interface unit 24 which, in turn, would provide a faster reaction time to changes in handle position. This configuration would also allow the ECP brake response to be very close to the same as with a fully ECP equipped locomotive.

In still another embodiment, the brake pipe 12 between the last locomotive and the first car may be segmented so that pneumatic emergency application would be provided via a relay valve. This configuration has the advantage of being able to precisely follow brake pipe pressure as input for ECP commands without being impacted by the rest of the train's air capacity.

Train Set-Up

As part of train set-up, the ECP/HOT interface unit 24 may report the number of ECP equipped train cars associated with the train consist so that a train crew can compare and/or verify such number and operation of ECP equipped train cars available in the train consist. In one embodiment of the present invention, each 5% loss of operable cars in the train may be reported as an alarm condition with a full service brake applied in the event of reaching a 15% loss of operative brakes. Other failure conditions, such as, for example, loss of trainline communications may also result in automatic braking (see A.A.R. S-4200 specifications).

ECP Migration

The present invention may also provide a migration path for application of ECP to unit trains with partially captive fleets, such as with intermodal train operations. The first step is to cable the fleet for ECP (even without the ECP valves). This would provide an initial train braking improvement simply by using a TrainLink®-ES EOT unit with ECP trainline communications. This alone may also allow increase of train speeds in some locations while also improving ride quality. The same portable HOT approach may be used to support TrainLink®-ES operation without needing to equip locomotives.

As cars are equipped with standalone ECP, they would potentially be operated in mixed consist configurations. This may be subject to setting guidelines in train make-up, such as grouping ECP and non-ECP cars together. In these cases, the ECP-equipped cars would be provided with brake commands electrically from the ECP/HOT interface unit 24 and the pneumatics cars would continue responding to changes in the brake pipe. The ECP brakes could not support graduated release operation in the mixed train consist. When each car is fully ECP equipped, they may operate with non-ECP locomotives including graduated release functions. As locomotives are equipped, full ECP functionality can be provided and the brake pipe can remain fully charged.

While the invention has been described in terms of preferred embodiments, those skilled in the art will recognize that the invention can be practiced with modification within the spirit and scope of the appended claims.

I claim:

1. An electronically controlled pneumatic (ECP) end of train (EOT) pneumatic emulation system, comprising:
   a locomotive control unit associated with a non-ECP equipped lead locomotive; and
   an interface unit providing ECP data to the locomotive control unit received from ECP equipped train cars via data communication links, wherein the locomotive control unit provides brake commands to the ECP equipped train cars via the interface unit in response to the ECP data received from the interface unit.

2. The system of claim 1, wherein the interface unit further provides EOT data to the locomotive control unit in response to information received from an EOT unit mounted on a last car of the train.

3. The system of claim 2, wherein the locomotive control unit provides communication with the interface unit via a wireless data link and the interface unit provides communication with the ECP equipped trains and the EOT unit via an ECP trainline.

4. The system of claim 1, wherein the interface unit is an ECP/head of train (HOT) interface unit which emulates a Head End Unit (HEU) in order to provide system set-up and status reporting.

5. The system of claim 1, wherein the ECP equipped train cars respond to the brake commands over an ECP trainline as initiated from the interface unit, wherein the ECP equipped train cars apply and release brakes in response to changes in brake pipe pressure when there is a failure to receive the ECP message, and wherein brake operation are provided under pneumatics control during ECP failure.

6. The system of claim 1, wherein the interface unit supports direct release and graduated release braking applications such that in the graduated release application the interface unit sends ECP commands to release brake pipe pressure in steps to the ECP equipped trains as brake pipe pressure is restored.

7. The system of claim 1, wherein the locomotive control unit is a portable unit having receiver and display functions used for ECP related text messages.

8. The system of claim 1, wherein the interface unit provides a migration path for application between the ECP equipped train cars and non-ECP equipped train cars such that the ECP equipped train cars are provided with brake commands electrically from the interface unit via the locomotive control unit and the non-equipped train cars respond to changes in brake pipe pressure.

9. An electronically controlled pneumatic (ECP) end of train (EOT) pneumatic emulation system, comprising:
   a locomotive control unit associated with a non-ECP equipped lead locomotive; and
   means for interfacing ECP data to the locomotive control unit received from ECP equipped train cars, wherein the locomotive control unit provides brake commands to the ECP equipped train cars via the interface unit in response to the ECP data received from the interface unit.

10. The system of claim 9, wherein said means for interfacing supports both direct and graduated release braking applications such that in the graduated release application the interface unit sends ECP commands to release brake pipe pressure in steps to the ECP equipped trains as brake pipe pressure is restored.

11. A method of electronically controlling a brake pipe pressure in a train having an electronically controlled pneumatic (ECP) end of train (EOT) pneumatic emulation system, comprising the steps of:
   providing a start brake pipe pressure;
   determining whether a rate of change of the start brake pipe pressure is within a predetermined threshold limit;
   providing an ECP message to the EOT and individual train cars to make a service brake application when the determining step determines that the rate of change of the start brake pipe pressure is within the threshold limit.

12. The method of claim 11, further comprising providing an ECP message to the EOT and individual train cars to make an emergency brake application when the determining step determines that the rate of change of the start brake pipe pressure exceeds the threshold limit.

13. The method of claim 12, further comprising:

monitoring an emergency brake pressure at a head of train (HOT) associated with the EOT; and monitoring the emergency brake pressure at the EOT, wherein the emergency brake pressure provides the emergency brake application.

14. The method of claim 13, further comprising:

determining when the emergency brake pipe pressure measured by the EOT exceeds a first predetermined limit;

determining when the emergency brake pipe pressure measured by the HOT exceeds a second predetermined limit, wherein the emergency brake pipe application remains active when the EOT determining step and the HOT determining step are below the predetermined limit and the second predetermined limit, respectively.

15. The method of claim 14, wherein the first predetermined limit is approximately 70 PSI and the second predetermined limit is approximately 5 PSI plus the first predetermined limit.

16. The method of claim 14, further comprising increasing the brake pipe pressure to the start brake pipe pressure when the EOT determining step and the HOT determining step exceed the predetermined limit and the second predetermined limit, respectively.

17. The method of claim 11, further comprising providing an ECP message to the EOT and individual train cars to make an emergency brake pressure application when the service brake application exceeds a predetermined reduction in brake pipe pressure.

18. The method of claim 17, wherein the predetermined reduction in brake pipe pressure is approximately 120% of a full service brake application.

19. The method of claim 11, further comprising determining whether there is a change in the start brake pipe pressure prior to the determining whether a rate of change of the start brake pipe pressure is within the predetermined threshold limit, wherein a second ECP message is provided to the EOT and the individual train cars when there is no change to the start brake pipe pressure.

20. The method of claim 19, wherein the second message instructs the EOT and individual train cars to remain at the start brake pipe pressure.

* * * * *

UNITED STATES PATENT AND TRADEMARK OFFICE
CERTIFICATE OF CORRECTION

PATENT NO. : 6,839,664 B1
DATED : January 4, 2005
INVENTOR(S) : Kull

It is certified that error appears in the above-identified patent and that said Letters Patent is hereby corrected as shown below:

Title page,
Item [*] Notice, delete:
"Subject to any disclaimer, the term of this patent is extended or adjusted under 35 U.S.C. 154(b) by 814 days.

This patent is subject to a terminal disclaimer." and insert in its place:
-- [*] Notice:   The term of this patent shall not extend beyond the expiration date of Patent No. 6,217,126. --
Item [57], ABSTRACT,
Lines 2-3, "fill train operation" should read -- full train operation --

Column 11,
Line 20, "approximately 5 PSI" should read -- approximately 15 PSI --

Signed and Sealed this

Seventh Day of June, 2005

JON W. DUDAS
*Director of the United States Patent and Trademark Office*